M. J. POWER.

MACHINE FOR SPLITTING WOOD.

APPLICATION FILED SEPT. 26, 1910.

Reissued Mar. 21, 1911.

13,221.

2 SHEETS—SHEET 1.

Witnesses:
Casamir Young.
May Downey

Inventor
Michael J. Power.
By Elphant & Young
Attorneys.

THE NORRIS PETERS CO., WASHINGTON, D. C.

M. J. POWER.

MACHINE FOR SPLITTING WOOD.

APPLICATION FILED SEPT. 26, 1910.

Reissued Mar. 21, 1911.

13,221.

2 SHEETS—SHEET 2.

Witnesses:
Cassian Young
May Downey

Inventor:
Michael J. Power.
By Upham & Young
Attorneys.

THE NORRIS PETERS CO., WASHINGTON, D. C.

UNITED STATES PATENT OFFICE.

MICHAEL J. POWER, OF NEKOOSA, WISCONSIN, ASSIGNOR TO HERMAN G. SAECKER, OF APPLETON, WISCONSIN.

MACHINE FOR SPLITTING WOOD.

13,221. Specification of Reissued Letters Patent. Reissued Mar. 21, 1911.

Original No. 946,705, dated January 18, 1910, Serial No. 511,399. Application for reissue filed September 26, 1910. Serial No. 583,977.

*To all whom it may concern:*

Be it known that I, MICHAEL J. POWER, a citizen of the United States, residing at Nekoosa, in the county of Wood and State of Wisconsin, have invented a new and useful Machine for Splitting Wood, of which the following is a specification.

This invention relates to machines of that type particularly designed for splitting pulp wood and the like, the objects being to simplify and improve upon machines of this character by providing novel means whereby balanced power may be transmitted to the ax or splitting head.

With the above object in view the invention consists of certain novel details of construction and combinations of parts hereinafter more fully described and pointed out in the claims.

In the accompanying drawings the preferred form of the invention has been shown.

Figure 1:
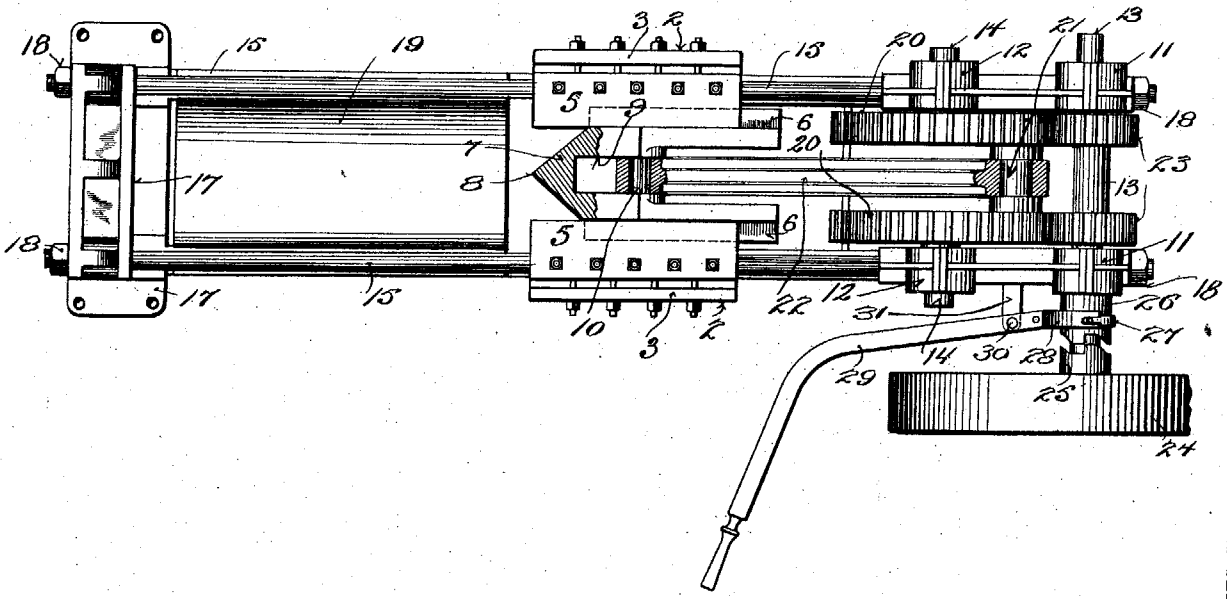
Figure 2:
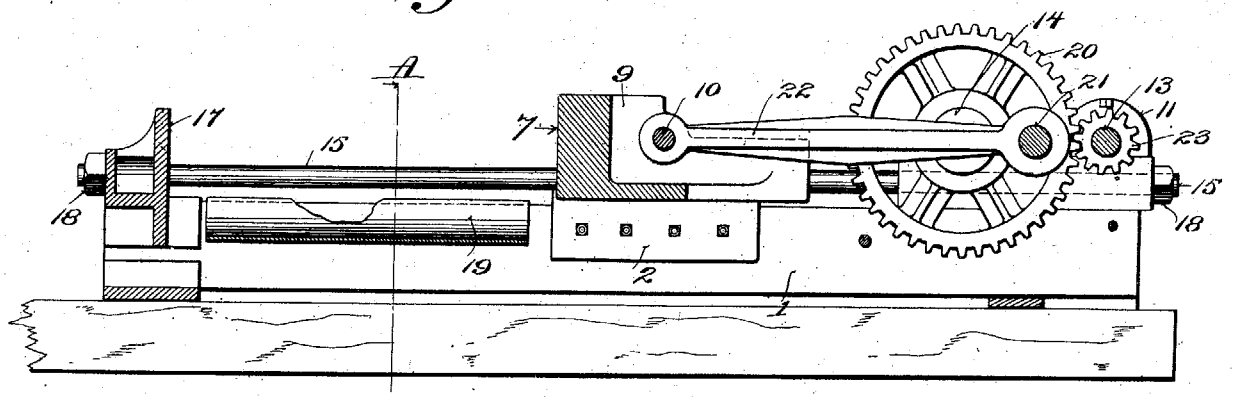
Figure 4:
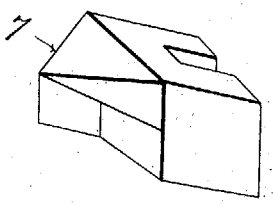
Figure 3:
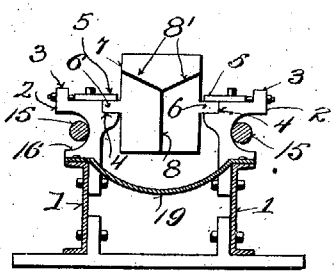

In said drawings: Figure 1 is a plan view of a machine embodying the present improvements, a portion of the ax or splitting head being shown in section. Fig. 2 is a view partly in side elevation and partly in longitudinal section. Fig. 3 is a section on the line A—B of Fig. 2, the mechanism back of the ax or splitting head being removed. Fig. 4 is a detail view of the ax or splitting head.

Referring to the figures by characters of reference, 1 designates the body of the machine, the same being preferably formed of angle irons secured in any preferred manner, there being guide rails 2 secured upon the sides of the body, each of said rails being provided on its upper face with a longitudinally extending guide flange 3 and a longitudinally extending groove 4. Retaining plates or caps 5 are folded upon the rails 2 and against the flanges 3, these plates extending over the grooves 4 and serving to retain within the grooves the flanges 6 of a head 7 mounted between the guide rails 2. This head constitutes the ax or splitting member and may be provided with one or more cutting edges. In the drawings said member has been shown provided with a cutting edge 8 and an angular splitting portion 8′ thereabove, the cutting face of the ax being substantially Y-shaped. The head 7 has a recess 9 in the back thereof which is intersected by a cross pin 10.

Two sets of bearings 11 and 12 respectively, extend upwardly from the sides of the body 1 adjacent the rear end thereof, one set of bearings supporting a drive shaft 13 while the other bearings have shafts 14 journaled therein. Tie rods 15 extend through the bearings of the two sets and also longitudinally within grooves or channels 16 formed in the outer faces of the rails 2, one end of each of the rods being also extended through an abutment 17 mounted on the front end of the body. Nuts or heads 18 are arranged upon the ends of the rods 15 and when these are tightened, the abutment 17 is held firmly tied to the bearings 11 and 12 and longitudinal separation of the bearings and abutment is thus prevented during the splitting operation. A supporting plate 19 is mounted on the sides of the body between the abutments 17 and the rails 2 and constitute means for supporting pieces of wood in the path of the splitting member 7. This plate is preferably concave as indicated in Fig. 3. Similar gears 20 are keyed or otherwise secured to the shafts 14 close to and between the bearings 12, these gears being connected adjacent their peripheries by a crank-pin 21, which crank-pin in connection with the gears and shafts constitutes a crank-shaft. Mounted upon the crank-pin is one end of a pitman 22, this pitman extending into the recess 9 and being mounted on the pin 10 heretofore referred to. Each of the gears 20 meshes with a smaller driving gear 23, the two driving gears being keyed or otherwise secured upon the drive shaft 13. A pulley 24 is loosely mounted on this drive shaft and has a clutch member 25 extending therefrom. Another clutch member 26 is carried on the shaft 13 and is loosely engaged by a band 27 to which a yoke 28 is pivotally connected, this yoke being formed at one end of the lever 29 which is fulcrumed as at 30 upon a bracket 31 extending from one side of the body 1. One end of the lever extends to a point where it can be conveniently reached by the operator.

In using the machine herein described, the length of wood to be split is placed upon the supporting plate 19 and this serves to properly center it in the path of the splitting head or ax 7. The pulley 24 and clutch member 25 being in motion, the lever 29, when shifted laterally, will move the clutch member 26 into engagement with the clutch member 25 and the shaft 13 will thus be actuated. Gears 33 will therefore drive the gears 20 simultaneously and the crank-pin 21 will transmit motion through the pitman 22 to the head 7. Said head will be shifted along the rails 2 in the direction of the abutment 17 and the edges 8 of the head will bite into and separate the wood which, of course, will be forced by the head against the abutment. During the second half of the rotation of the gears 20 the head 7 will be returned to its initial position and can be promptly stopped by shifting the lever 29 so as to disengage the clutch members.

Importance is attached to the arrangement of parts whereby the bearings of the two shafts are tied to the abutment 17, thus relieving the machine of undesirable longitudinal pressure such as might result in the breaking or the displacement of the bearings or the abutment.

Although the cutting head or ax has been shown and described as designed to cut into three parts it is to be understood that if preferred this head can be so shaped as to cut a block of wood into two or four parts.

Importance is attached to the fact that in lieu of a crank shaft such as is ordinarily utilized for actuating a pitman, gears connected by a crank-pin are provided, motion being transmitted to both of the gears simultaneously and all the tendency of twisting the shafts upon which the gears are mounted is thus eliminated.

It will be understood that various changes may be made in the construction and arrangement of the parts without departing from the spirit or sacrificing any of the advantages of the invention.

What is claimed is:

1. A machine of the class described, including a body, an abutment thereon, bearings upstanding from the body and disposed in pairs, a drive shaft journaled in one pair of bearings, gears thereon, separately alined shafts journaled within the other pair of bearings, similar gears upon the inner or adjoining ends of the alined shafts and meshing with the respective gears upon the drive-shaft, a crank pin constituting the sole connection between said similar gears, a pitman mounted upon the crank pin and extending between said gears, a splitting head mounted for sliding movement upon the body, said pitman being pivotally connected to the head, means upon and coöperating with the body for holding the head against lateral and vertical displacement during the reciprocation thereof, and tie rods disposed upon opposite sides of the body extending through the abutment and bearings for holding said abutment and both pairs of bearings against relative movement, said rods being disposed beyond the outer faces of the body.

2. A machine of the class described, including a body, an abutment thereon, bearings upstanding from the body and disposed in pairs, a drive shaft journaled in one pair of bearings, gears thereon, separately alined shafts journaled within the other pair of bearings, similar gears upon the inner or adjoining ends of the alined shafts and meshing with the respective gears upon the drive-shaft, a crank pin constituting the sole connection between said similar gears, a pitman mounted upon the crank pin and extending between said gears, a splitting head mounted for sliding movement upon the body, said pitman being pivotally connected to the head, means upon and coöperating with the body for holding the head against lateral and vertical displacement during the reciprocation thereof, and tie rods disposed upon opposite sides of the body extending through the abutment and bearings for holding said abutment and both pairs of bearings against displacement.

3. In a wood splitting machine having a body, an abutment thereon, two sets of alined bearings secured to the body, a splitter mounted for sliding movement upon the body, and tie-rods disposed upon opposite sides of the body extending through the abutment and both pairs of bearings for holding said abutment and bearings against relative movement; the combination of a drive-shaft journaled in one pair of the aforesaid bearings, a pair of gear-wheels spaced apart and secured thereon, oppositely disposed alined shafts journaled in the other pair of bearings, a gear-wheel carried by each of the aforesaid alined shafts in meshed engagement with the pair of drive-shaft gear-wheels, a crank connecting the gear-wheels carried by the separate alined shafts, and a pitman connecting the crank and splitter head.

In testimony that I claim the foregoing as my own, I have hereto affixed my signature in the presence of two witnesses.

MICHAEL J. POWER.

Witnesses:
HENRY E. FITCH,
P. O. WINTHER.

Copies of this patent may be obtained for five cents each, by addressing the "Commissioner of Patents, Washington, D. C."